(12) United States Patent
Zapf

(10) Patent No.: US 8,564,391 B2
(45) Date of Patent: *Oct. 22, 2013

(54) PAINT COMPOSITION, IN PARTICULAR ANTI-CORROSIVE PAINT FOR RARE EARTH PERMANENT MAGNETS

(75) Inventor: Lothar Zapf, Alzenau (DE)

(73) Assignee: Vacuumschmelze GmbH & Co. KG, Hanau (DE)

( * ) Notice: Subject to any disclaimer, the term of this patent is extended or adjusted under 35 U.S.C. 154(b) by 518 days.

This patent is subject to a terminal disclaimer.

(21) Appl. No.: 12/293,730

(22) PCT Filed: Jan. 16, 2007

(86) PCT No.: PCT/EP2007/000308
§ 371 (c)(1),
(2), (4) Date: Jul. 19, 2010

(87) PCT Pub. No.: WO2007/107192
PCT Pub. Date: Sep. 27, 2007

(65) Prior Publication Data
US 2010/0283568 A1    Nov. 11, 2010

(30) Foreign Application Priority Data

Mar. 21, 2006 (DE) .......... 10 2006 012 839

(51) Int. Cl.
*H01F 7/02* (2006.01)
*C09D 163/00* (2006.01)
*C09J 163/00* (2006.01)
*C08G 59/38* (2006.01)
*C08G 59/62* (2006.01)

(52) U.S. Cl.
USPC ............ 335/306; 156/330; 523/427; 525/524

(58) Field of Classification Search
None
See application file for complete search history.

(56) References Cited

U.S. PATENT DOCUMENTS

| 3,474,073 | A | | 10/1969 | Higashi | 252/62.54 |
| 4,103,195 | A | * | 7/1978 | Torossian et al. | 310/216.065 |
| 5,075,155 | A | * | 12/1991 | Jellinek et al. | 428/209 |
| 5,098,496 | A | * | 3/1992 | Breitigam et al. | 156/180 |
| 5,418,265 | A | | 5/1995 | Matsuzaki et al. | 523/440 |
| 6,103,157 | A | | 8/2000 | Behm et al. | 264/102 |
| 6,555,601 | B1 | * | 4/2003 | Behm et al. | 523/435 |
| 2010/0164308 | A1 | * | 7/2010 | Zapf | 310/45 |
| 2012/0034458 | A1 | * | 2/2012 | Zapf | 428/339 |

FOREIGN PATENT DOCUMENTS

| DE | 27 00 363 A1 | 7/1977 |
| EP | 0 889 484 A2 | 1/1999 |
| EP | 0 947 532 B1 | 1/2006 |
| GB | 1 532 592 | 7/1977 |
| JP | 2000-513036 | 10/2000 |
| JP | 2002-060674 | 2/2002 |
| JP | 2003-246838 | 9/2003 |
| WO | WO 2005/033172 A1 | 4/2005 |

OTHER PUBLICATIONS

Product Data Sheet for Silsquest A-186 Silane and Silsquest A-187 Silane, provided by Crompton Corp (2002).*
Japanese Office Action (Notification of Reason for Refusal) dated Mar. 21, 2012, issued in the corresponding Japanese Patent Application No. 2009-500710 (Partial English translation only) (6 pages).

* cited by examiner

*Primary Examiner* — Michael J Feely
(74) *Attorney, Agent, or Firm* — Buchanan Ingersoll & Rooney PC

(57) ABSTRACT

A paint composition, in particular an anti-corrosive paint, for rare earth permanent magnets, has an epoxy resin mixture, a curing accelerator, an epoxy-functional adhesion promoter based on silane and a solvent. Due to the paint compositions, rare earth permanent magnets can be bonded simultaneously to a magnet system in a one method step and can be protected against corrosion. Due to the anti-corrosive paint, magnet systems which have excellent anti-corrosion properties, a satisfactory adhesive strength even at high temperatures and display good electric insulation properties, are provided.

20 Claims, No Drawings

PAINT COMPOSITION, IN PARTICULAR ANTI-CORROSIVE PAINT FOR RARE EARTH PERMANENT MAGNETS

CROSS-REFERENCE TO RELATED APPLICATIONS

This application is a U.S. national stage application of International Application No. PCT/EP2007/000308 filed Jan. 16, 2007, which designates the United States of America, and claims priority to German application number 10 2006 012 839.7 filed Mar. 21, 2006, the contents of which are hereby incorporated by reference in their entirety.

TECHNICAL FIELD

The present invention relates to a lacquer composition, particularly a corrosion protection lacquer for rare earth permanent magnets, based on an epoxy resin mixture, an accelerator, an epoxy-functional adhesive agent based on silane, as well as a solvent.

BACKGROUND

Magnets and magnetic systems, particularly such comprising NdFeB-magnets, must generally be protected from corrosion. This requires an appropriate coating, e.g., a lacquering.

In the structure of magnetic systems the magnets are connected to each other and/or other work pieces, such as steel back irons or other magnetically soft work pieces, by way of adhesion. Here, it is required that the adhesive connection shows high stability, preferably ≥10 N/mm² in connection to a high temperature resistance. For example, temperatures up to 180° C. develop in applications in motors and high opposing fields act upon the magnets. The adhesion must withstand such conditions.

In the so-called segmented magnetic systems composed from several individual magnets the system is fixed and held together by way of adhesion. The cured adhesive film furthermore has the function to electrically insulate the individual magnets from each other. A good electric insulation is necessary because such systems are used in large electrically operating machines, such as marine engines, wind generators, etc. and the electric insulation of the individual magnets prevents the occurrence of strong eddy currents and thus the engine from overheating.

When producing magnetic systems usually the process includes that the magnets are adhered with the help of liquid high-performance adhesives, such as epoxy resins, acrylates, etc. Subsequently the magnetic systems are coated with a corrosion protection to protect the systems from the environment and the influences of chemicals. Here, generally enamel is used, however frequently the problem occurs that in the area of the adhesion gap faulty enamel sections appear, which are caused by enclosed gas and/or air bubbles.

This problem can be avoided in that the corrosion protection is applied prior to the adhesion, which however disadvantageously adds another processing step for each individual magnet.

Attempts have been made to perform the production of the corrosion protection as well as the adhesion of the magnets in a single processing step. However it has shown that the lacquers used here cannot fully comply with the requirements of some systems. For example, when standard lacquers on a phenol-resin base are used comprising additional fillers, such as aluminum or zinc or corrosion protection pigments, the required insulation properties for segmented systems are not achieved. Furthermore, brittleness develops in such systems in extended high-temperature aging. In standard epoxy resin lacquers it has been found that the adhesive strength is insufficient at high temperatures.

SUMMARY

Lacquering not showing any of the above-described disadvantages can be provided.

Furthermore, a method can be provided allowing to produce magnetic systems with sufficient adhesive strength, good insulation properties, a good high-temperature resistance, and an excellent adhesion of the lacquer, in which the lacquer and the corrosion protection are performed in a single processing step.

According to an embodiment, a lacquer composition as a corrosion protection lacquer for rare earth permanent magnets based on an epoxy resin mixture, an accelerator, an epoxy-functional adhesive agent based on silane, and a solvent, with the epoxy resin mixture may comprise a) 1 to 95% by weight of at least one solid epoxy resin having an epoxy number up to a maximum of 2 Eq/kg, b) 1 to 50% by weight solid multi-functional epoxy resin having an epoxy number >4 Eq/kg and c) 5 to 40% by weight phenol and/or cresol novolak having a melting point >30° C., preferably >100° C. According to a further embodiment, the epoxy resin mixture may comprise 1 to 80% by weight solid epoxy resin having an epoxy number <1 Eq/kg and 1 to 80% by weight solid epoxy resin having an epoxy number ranging from 1 to 2 Eq/kg. According to a further embodiment, the epoxy resin mixture may comprise a) 40 to 60% by weight solid epoxy resin having an epoxy number <1 Eq/kg; b) 20 to 40% by weight solid epoxy resin having an epoxy number ranging from 1 to 2 Eq/kg; c) 10 to 40% by weight solid multi-functional epoxy resin having an epoxy number >4 Eq/kg and d) 10 to 20% by weight phenol and/or cresol novolak. According to a further embodiment, at least one solid epoxy resin may have an epoxy number up to a maximum of 2 Eq/kg being an epoxy resin based on bisphenol-A and/or bisphenol-F. According to a further embodiment, at least one multi-functional epoxy resin may have an epoxy number >4 being selected from the group comprising epoxy phenol novolaks, epoxy cresol novolaks, tri-glycidyl isocyanurates, and/or mixtures thereof. According to a further embodiment, the accelerant may comprise at least one of tertiary amines and imidazol derivatives, preferably 2-ethyl-4-methyl imidazol. According to a further embodiment, the portion of the epoxy functional adhesive agent on a silane basis may amount to 0.1 to 5% by weight, preferably 1 to 3% by weight in reference to the solid resin mixture. According to a further embodiment, the epoxy-functional adhesive agent may be selected from a group comprising γ-glycidyloxy propyl tri-methoxy silane and β-(3,4-epoxy cylohexyl)-ethyl tri-methoxy silane. According to a further embodiment, the solvent may comprise aliphatic and aromatic hydrocarbons, ethers, esters, glycol ethers, alcohols, ketones, and mixtures thereof. According to a further embodiment, the solid matter portion of the lacquer composition may range from 1 to 50% by weight, preferably 10 to 20% by weight. According to a further embodiment, the lacquer composition additionally may comprise corrosion protection pigments, such as zinc phosphate, zinc chromate, and zinc hydroxyl phosphite. According to a further embodiment, the lacquer composition may additionally comprise additives, such as soluble colorants, leveling agents and defoaming agents, non-metal fillers such as silica dust, mica, and talcum, dispersible color pigments, such as soot and rutile, dispersing agents and/or rheologic additives and settling agents, such as bentonite or aerosil.

According to another embodiment, a method for producing magnetic systems may use such a lacquer composition, wherein the method may comprise the steps a) coating at least one magnet with the lacquer composition as a corrosion protection lacquer, b) dehydrating the lacquer coating, c) assembling the magnets coated with lacquer with another coated magnet or other work pieces to form a magnetic system, and d) fixing the magnetic system in a stove.

According to a further embodiment, the magnetic system may have a minimum pressure resistance of 10 N/mm², a permanent temperature resistance of 150° C., and the lacquer coating having a layer thickness ranging from 10 to 50 µm and being electrically insulating.

DETAILED DESCRIPTION

Surprisingly it has been found during the search for an effective lacquer for simultaneously adhering and protecting magnetic parts that the lacquer composition based on an epoxy resin mixture, an accelerator, an epoxy-functional adhesive agent based on silane, and a solvent fulfills the high requirements demanded from a corrosion protection lacquer for rare earth permanent magnets. Here it is necessary for the epoxy resin mixture to at least include 1 to 95% by weight solid epoxy resin having an epoxy number of no more than 2 Eq/kg, at least 1 to 50% by weight multi-functional epoxy resin having an epoxy number >4 Eq/kg, and 5 to 40% by weight phenol and/or cresol-novolak having a melting point >30° C.

In addition to this particular epoxy resin mixture the corrosion protection lacquer includes an accelerator, with preferably tertiary amines or imidazol derivatives being used. For example, 2-ethyl-4-methyl imidazol is a preferred accelerator. In order to ensure the excellent adhesion of the lacquer on the permanent magnetic material the lacquer composition further includes an epoxy-functional adhesive agent based on silane. Here, γ-glycidyloxy-propyl tri-methoxy silanes or β-3,4-epoxy cyclohexyl)-ethyl tri-methoxy silanes have proven particularly advantageous. Usually the adhesive agents are used at an amount ranging from 0.1-5% by weight, preferably 1-3% by weight, in reference to the solid resin mixture.

The solvent for the lacquer is not required to comply with particular specifications, thus aliphatic and aromatic hydrocarbons, ethers, esters, glycol ethers, alcohols, ketones, and/or mixtures thereof can be used. The lacquering of the parts themselves occurs in a conventional manner by painting, immersing, spray-painting, centrifuging, molding, or other methods, with spray-painting, both in the through-feed method as well as the tumble-cage process, being used preferably due to the geometry of the parts to be lacquered. For this reason it is beneficial for the solid matter portion of the lacquer not to be excessive and amount to no more than 50% by weight, preferably ranging from 10 to 20% by weight.

In an embodiment of the lacquer composition the epoxy resin mixture includes 1-80% by weight solid epoxy resin having an epoxy number 1-2 Eq/kg.

An embodiment of the lacquer composition comprises 40-60% by weight solid epoxy resin having an epoxy number <1 Eq/kg, 20-40% by weight solid epoxy resin having an epoxy number 1-2 Eq/kg, 10-40% by weight solid multi-functional epoxy resin having an epoxy number >4 Eq/kg, and 10-20% by weight phenol and/or cresol-novolak. Here, the solid epoxy resins having an epoxy number up to a maximum of 2 Eq/kg are preferably epoxy resins based on bisphenol-A and/or bisphenol-F.

In further embodiments of the lacquer compositions the multi-functional epoxy resin has an epoxy number >4 Eq/kg is selected from a group comprising epoxy phenol novolaks, epoxy cresol novolaks, and triglycidyl isocyanurate and/or mixtures thereof.

In order to improve the properties of the lacquer composition as corrosion protection it is beneficial when the lacquer composition includes corrosion protection pigments, such as zinc phosphate, zinc chromate, or zinc hydroxyl phosphite.

Another optimization of the lacquer composition can be achieved in that further additives, such as soluble colorants, leveling agents and defoaming agents, non-metal fillers, such as quartz, mica, and talcum, dispersible color pigments, such as soot, rutile, as well as dispersing agents and/or rheological additives and/or settling agents, such as bentonite or aerosil, are used in the lacquer composition.

The lacquer according to an embodiment is particularly suitable for the use in a method for producing magnetic systems, comprising the steps of coating at least one magnet with said corrosion protection lacquer, the dehydration of the lacquer coating, the assembly of the work pieces coated with lacquer, and the fixation of the magnetic system yielded in this manner in a stove. In contrast to conventional technology, in this case the adhesion of the magnets is combined with the corrosion protection and both the corrosion protection and the adhesion of the magnet are cured together in the stove.

This way it is achieved to produce a magnetic system having a minimum pressure resistance of >10 N/mm² and a constant temperature resistance of 150° C. The layer thickness of the lacquer coating preferably ranges from 10 to 50 µm. The pressure resistances of magnetic adhesions reach more than 25 N/mm² at room temperature and even at 130° C. still amounts to more than 5 N/mm².

In the following the invention is explained in detail using examples.

Example 1

Production of the Lacquer Solution 25 g of a bisphenol-A solid resin having an epoxy value of 0.3 Eq/kg, 10 g of a bisphenol-A resin having an epoxy value of 1.5 Eq/kg, 8 g of an epoxy phenol novolak having an epoxy value of 5.6 Eq/kg, as well as 7 g of a cresol novolak having a melting point of 120° C. are dissolved in 200 g of a solvent mixture comprising 3 parts methyl ethyl ketone and one part ethanol. 0.25 g 2-ethyl-4-methyl emidazol and 0.5 g γ-glycidyloxy propyl tri-methoxy silane is added to this solution. The clear lacquer solution yielded in this manner is used for additional exemplary applications.

Example 2

Production of Magnetic Systems

The lacquer produced in example 1 was sprayed with a spraygun onto a permanent magnetic cube comprising a neodymium iron boron alloy. The magnetic cubes with dimensions of 50×12×5 were then dehydrated at 50° C. for 30 minutes. The coating thickness of the lacquer after the dehydration amounted to approximately 15 to 25 µm. Eight cubic magnets each were fixed with the help of a clamping device to form a block, with the contact surface amounting to 50×12 mm. The magnetic system produced in this manner was cured in the forced-air oven at 150° C. for 3 hours.

The hardest magnetic blocks were subsequently subjected to a circuit continuity test, with the adhered block being cleared of lacquer at one side by way of sanding and being impinged with a voltage of 30 Volt using a direct-current source. This way it could be determined that all adhesions showed an excellent insulating effect and prevented any circuit continuity.

Example 3

Autoclave Test

In an autoclave test at 130° C. five magnetic blocks produced according to example 2 were subjected to a corrosion test at 100% humidity and a pressure of 2.7 bar. Even after a test period of seven days (168 hours) no traces of corrosion were found and no layer delamination could be observed.

Example 4

Salt Spray Test

Five magnetic blocks produced according to example 2 were subjected to a salt spray test according to DIN 50021. After a test period of 240 hours no corrosion effects were discernible at the magnetic blocks.

Example 5

Harmful Gas Test

Five magnetic blocks that had been produced according to the method in example 2 were subjected to a harmful gas test according to DIN 50018. After 21 test cycles no corrosive attacks could be determined on the lacquer or the magnetic material.

Example 6

Temperature Resistance of the Lacquer

The lacquer produced according to example 1, in its cured state, was subjected to a thermographimetric analysis with a heating rate of 5 K/min. As a result, the disintegration point was determined at 410° C., which means that the lacquer can be used for all high-temperature applications of NdFeB-magnets. The upper limit for high-temperature applications for this material itself amounts to approximately 210° C., because above this temperature irreversible heat loss must be expected.

Example 7

Adhesion Stability

A magnetic plate produced according to a method in example 2 was subjected to a compressive-shear test. In the experiment performed the magnetic material broke at 15,000 N, while the adhesion itself was not affected.

Example 8

Compressive-Shear Tests

The adhesive lacquer produced according to example 1 has been performed according to DIN 54451 compressive-shear tests. Here, at room temperature compressive-shear stability resulted for the magnet-magnet adhesions amounting to more than 25 N/mm$^2$. Even at 130° C. the compressive-shear stability still exceeded 5 N/mm$^2$.

The invention claimed is:

1. A lacquer composition as a corrosion protection lacquer for rare earth permanent magnets based on a resin mixture, an accelerator, an epoxy-functional adhesive agent based on silane, and a solvent, with the resin mixture comprising, based on the weight of the resin mixture:
    a) 20-40% by weight of at least one solid epoxy resin having an epoxy number of from 1-2 Eq/kg,
    b) 10-40% by weight solid multi-functional epoxy resin having an epoxy number >4 Eq/kg,
    c) 10-20% by weight phenol and/or cresol novolak having a melting point >30° C., and
    d) 40 to 60% by weight solid epoxy resin having an epoxy number <1 Eq/kg.

2. The lacquer composition according to claim 1, wherein the at least one solid epoxy resin having an epoxy number of from 1-2 Eq/kg is an epoxy resin based on bisphenol-A and/or bisphenol-F.

3. The lacquer composition according to claim 1, wherein the at least one multi-functional epoxy resin having an epoxy number >4 Eq/kg is selected from the group consisting of epoxy phenol novolaks, epoxy cresol novolaks, tri-glycidyl isocyanurates, and mixtures thereof.

4. The lacquer composition according to claim 1, wherein the melting point of the phenol and/or cresol novolak c) is >100° C.

5. The lacquer composition according to claim 1, wherein the accelerator comprises tertiary amines and imidazole derivatives.

6. The lacquer composition according to claim 5, wherein the accelerator comprises 2-ethyl-4-methyl imidazol.

7. The lacquer composition according to claim 1, wherein the portion of the epoxy functional adhesive agent on a silane basis is to 0.1 to 5% by weight, based on the resin mixture.

8. The lacquer composition according to claim 1, wherein the portion of the epoxy functional adhesive agent on a silane basis is 1 to 3% by weight in reference to the solid resin mixture.

9. The lacquer composition according to claim 1, wherein the epoxy-functional adhesive agent is selected from the group consisting of γ-glycidyloxy propyl tri-methoxy silane and β-(3,4-epoxy cyclohexyl)-ethyl tri-methoxy silane.

10. The lacquer composition according to claim 1, wherein the solvent comprises an aliphatic or aromatic hydrocarbon, an ether, an ester, a glycol ether, an alcohol, a ketone, or mixtures thereof.

11. The lacquer composition according to claim 1, wherein the lacquer composition has a solid matter portion ranging from 1 to 50% by weight of the lacquer composition.

12. The lacquer composition according to claim 1, wherein the lacquer composition has a solid matter portion ranging from 10 to 20% by weight of the lacquer composition.

13. The lacquer composition according to claim 1, wherein the lacquer composition further comprises one or more corrosion protection pigments.

14. The lacquer composition according to claim 13, wherein the corrosion protection pigments are selected from the group consisting of zinc phosphate, zinc chromate, and zinc hydroxyl phosphite.

15. The lacquer composition according to claim 1, wherein the lacquer composition further comprises an additives selected from the group consisting of: soluble colorants, leveling agents and defoaming agents, non-metal fillers, dispersible color pigments, dispersing agents, rheologic additives and settling agents.

16. The lacquer composition according to claim 15, wherein the non-metal fillers are selected from the group consisting of silica dust, mica, and talcum.

17. The lacquer composition according to claim 15, wherein the dispersible color pigments are selected from the group consisting of soot and rutile.

18. The lacquer composition according to claim 15, wherein the settling agents are bentonite or aerosil.

19. A method for producing magnetic systems using a lacquer composition based on a resin mixture, an accelerator, an epoxy-functional adhesive agent based on silane, and a solvent, with the resin mixture comprising, based on the weight of the resin mixture:
 a) 1 to 80% by weight of at least one solid epoxy resin having an epoxy number of from 1-2 Eq/kg,
 b) 1 to 50% by weight solid multi-functional epoxy resin having an epoxy number >4 Eq/kg and
 c) 5 to 40% by weight phenol and/or cresol novolak having a melting point >30° C., the method comprising:
 a) coating at least one magnet with the lacquer composition as a corrosion protection lacquer,
 b) dehydrating the lacquer coating,
 c) assembling the magnets coated with lacquer with another coated magnet or other work pieces to form a magnetic system, and
 d) fixing the magnetic system in a stove.

20. A magnetic system produced according to the method of claim 19, wherein the magnetic system has a minimum pressure resistance of 10 $N/mm^2$, a permanent temperature resistance of 150° C., and wherein the lacquer coating has a layer thickness ranging from 10 to 50 µm and is electrically insulating.

* * * * *